US 8,543,001 B2

(12) United States Patent
Cheng (10) Patent No.: US 8,543,001 B2
(45) Date of Patent: Sep. 24, 2013

(54) CASCADED INJECTION LOCKING OF FABRY-PEROT LASER FOR WAVE DIVISION MULTIPLEXING PASSIVE OPTICAL NETWORKS

(75) Inventor: Ning Cheng, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 334 days.

(21) Appl. No.: 12/901,127

(22) Filed: Oct. 8, 2010

(65) Prior Publication Data

US 2011/0091214 A1   Apr. 21, 2011

Related U.S. Application Data

(60) Provisional application No. 61/253,592, filed on Oct. 21, 2009.

(51) Int. Cl.
*H04J 14/02* (2006.01)
*H04J 14/00* (2006.01)

(52) U.S. Cl.
USPC ............... 398/91; 396/70; 396/71; 396/72

(58) Field of Classification Search
USPC ............................................. 398/91, 70–73
See application file for complete search history.

(56) References Cited

U.S. PATENT DOCUMENTS

| | | | | |
|---|---|---|---|---|
| 5,940,207 A * | 8/1999 | Weich et al. | ............... | 359/333 |
| 6,577,422 B1 * | 6/2003 | Frigo et al. | ............... | 398/49 |
| 8,086,102 B2 * | 12/2011 | Kim et al. | ............... | 398/67 |
| 2004/0247320 A1 * | 12/2004 | Bickham et al. | ............... | 398/71 |
| 2006/0083515 A1 * | 4/2006 | Hann et al. | ............... | 398/87 |
| 2007/0297483 A1 * | 12/2007 | Wakabayashi et al. | ............... | 372/97 |
| 2009/0196612 A1 * | 8/2009 | Lee et al. | ............... | 398/72 |
| 2009/0220230 A1 * | 9/2009 | Kim et al. | ............... | 398/72 |
| 2010/0142954 A1 * | 6/2010 | Rossetti et al. | ............... | 398/72 |
| 2011/0020001 A1 * | 1/2011 | Kim et al. | ............... | 398/63 |

OTHER PUBLICATIONS

Kim, Hyun Deok, et al., "A Low-Cost WDM Source with an ASE Injected Fabry-Perot Semiconductor Laser," IEEE Photonics Technology Letters, vol. 12, Aug. 2000, pp. 1067-1069.

Shin, D.J., et al., "155 Mbit/s Trasmission Using ASE-injected Fabry-Perot Laser Diode in WDM-PON Over 70 C Temperature Range," Electronics Letters, vol. 39, Sep. 4, 2003, 2 pages.

(Continued)

*Primary Examiner* — Kenneth N Vanderpuye
*Assistant Examiner* — Abbas H Alagheband
(74) *Attorney, Agent, or Firm* — Conley Rose, P.C.; Grant Rodolph (57) ABSTRACT

An optical network unit (ONU) comprising a first optical fiber, a first optical circulator coupled to the first optical fiber, a first seed light injected laser coupled to the first optical circulator, wherein the first optical circulator is positioned between the first seed light injected laser and the first optical fiber, and a second seed light injected laser coupled to the first optical circulator and the first seed light injected laser, wherein the first optical circulator is positioned between the second seed light injected laser and the first optical fiber. Also disclosed is a method comprising receiving a seed light signal, amplifying the seed light signal using seed light injection locking, thereby producing an amplified seed light signal, and producing an optical signal using the amplified seed light signal and seed light injection locking, wherein the optical signal has about the same wavelength as the seed light signal.

19 Claims, 5 Drawing Sheets

(56) References Cited

OTHER PUBLICATIONS

Lee, Sang-Mook, et al., "Dense WDM-PON Based on Wavelength-Locked Fabry-Perot Laser Diodes," IEEE Photonics Technology Letters, vol. 17, Jul. 2005, pp. 1579-1581.

Xu, Zhaowen, et al., "High-speed WDM-PON Using CW Injection-locked Fabry-Perot Laser Diodes," Optics Express, vol. 15, Mar. 19, 2007, 10 pages.

* cited by examiner

CASCADED INJECTION LOCKING OF FABRY-PEROT LASER FOR WAVE DIVISION MULTIPLEXING PASSIVE OPTICAL NETWORKS

CROSS-REFERENCE TO RELATED APPLICATIONS

The present application claims priority to U.S. Provisional Patent Application No. 61/253,592 filed Oct. 21, 2009 by Ning Cheng and entitled "Cascaded Injection Locking of Fabry-Perot Laser for WDM PONs," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." The PON is a point to multi-point network comprised of an optical line terminal (OLT) at a central office, an optical distribution network (ODN), and a plurality of optical network units (ONUs) at the customer premises. Downstream data transmissions may be broadcast to all of the ONUs, while upstream data transmissions may be transmitted to the OLT using various multiple access techniques, such as time division multiple access (TDMA), wavelength division multiple access (WDMA), and frequency division multiple access (FDMA). These multiple access technologies ensure transmissions from the ONUs are received by the OLT without conflicting with one another. The per-user capacity of TDMA-based PONs is inversely proportional to the number of ONUs, partially because the time between one ONU completing its transmission and the next ONU starting transmission, known as the turnaround time, may only allow the transmission speed to scale up to a certain point without any data loss. As such, next generation PONs are likely to implement WDMA technology to achieve increased throughput.

WDMA systems use multiple light wavelengths to carry multiple data signals. Each of the wavelengths may be assigned to one of the ONUs, which allows for a point-to-point communications path from each ONU to the OLT. The multiple wavelength carrier signals are multiplexed onto an optical fiber before reaching the OLT. The components of a WDMA-based PON or wavelength division multiplexing (WDM) PON (WPON) system may be more complex and/or have a higher cost than other PON system components, in part because WPONs use high-precision lasers, optical amplifiers, optical filters, and/or optical splitters. Reducing overall system complexity and/or cost is important for implementing WPON systems.

SUMMARY

In one embodiment, the disclosure includes an optical network unit (ONU) comprising a first optical fiber, a first optical circulator coupled to the first optical fiber, a first seed light injected laser coupled to the first optical circulator, wherein the first optical circulator is positioned between the first seed light injected laser and the first optical fiber, and a second seed light injected laser coupled to the first optical circulator and the first seed light injected laser, wherein the first optical circulator is positioned between the second seed light injected laser and the first optical fiber.

In another embodiment, the disclosure includes an apparatus comprising an optical amplifier configured to receive a seed light signal and produce an amplified seed light signal, an optical polarization component configured to receive the amplified seed light signal, adjust the polarization state of the amplified seed light signal, and produce a modified seed light signal, and an optical transmitter configured to receive the modified seed light signal, modulate the modified seed light signal, and produce an optical signal within a wavelength channel.

In yet another embodiment, the disclosure includes a method comprising receiving a seed light signal, amplifying the seed light signal using seed light injection locking, thereby producing an amplified seed light signal, and producing an optical signal using the amplified seed light signal and seed light injection locking, wherein the optical signal has about the same wavelength as the seed light signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The PON system comprises a plurality of laser transmitters, each of which may be aligned with substantially high precision to emit at a corresponding wavelength within an assigned passband of a WDM filter, such as an arrayed wave guide (AWG) filter. In some PON systems, the laser transmitters may comprise a plurality of seed light injected lasers, such as injection locked Fabry-Perot laser diodes (IL FP LDs), semiconductor optical amplifiers (SOAs), reflective semiconductor optical amplifiers (RSOAs), reflective optical amplifiers (ROAs), reflective electro-absorption modulators (REAMs), or other types of seed light injected lasers. The seed light injected lasers may use an injection locking mechanism to transmit a plurality of wavelength channels at a plurality of narrowband or single wavelength signals. The seed light injected lasers may transmit the wavelength channels using a plurality of seed lights at the corresponding wavelengths, which may be generated by filtering a broadband light source (BLS), e.g. via a WDM. Some PON systems may require a relatively high power BLS, such as an amplified spontaneous emission (ASE) BLS, to generate seed lights at sufficient power to provide adequate injection locking to the seed light injected lasers. Such high powered BLSs (e.g. an ASE BLS) may be more costly/complex and may emit broadband light signals comprising higher amounts of relative intensity noise (RIN) when compared to less powerful BLSs. Therefore, the seed lights provided to the seed light injected lasers may also comprise relatively high RIN, which may limit the seed light injected laser's effective transmission range and/or achievable data-rate.

In some PON systems, the BLS may be replaced by a distributed feedback laser (DFB) array that is capable of providing relatively low noise seed light signals with adequate power output. However, the DFB array may add substantial cost and/or complexity to the system and may produce substantially polarized seed light signals that require polarization correction, e.g. using depolarizers. In some cases, the DFB array's emissions may have a severe polarization state that exceeds the correction capabilities of commercially available depolarizers. For example, the partially-corrected seed light signals may not be suitable to provide injection locking for some seed light injected lasers that may be polarization sensitive, such as IL FP LDs.

Disclosed herein are systems and methods to provide a plurality of seed light signals to a plurality of PON seed light injected lasers using a cascaded injection locking configuration. The cascaded injection locking configuration may provide substantially high power and/or low noise transmissions by maintaining seed light signals at adequate power for injection locking, all while enabling the implementation of a relatively low power BLS. The substantially higher powered and/or low noise transmissions may allow for a reduced bit error rate (BER) over the prior art, e.g. a system having a BER of about $10^{-3}$-$10^{-4}$ may achieve a reduced BER of about $10^{-8}$-$10^{-9}$ by implementing the systems and/or methods disclosed herein. The use of a relatively low power BLS may also reduce system cost, complexity, and/or power consumption in the PON. The BLS may emit a broadband light (e.g. white light) signal, which may be filtered using a WDM to generate a plurality of narrowband/single-wavelength seed light signals for the corresponding seed light injected lasers. Each of the seed light signals may then be amplified by a first seed light injected laser, such as an IL FP LD, acting as an optical amplifier and subsequently forwarded to a second seed light injection laser that acts as an optical transmitter. Additionally, a polarization correction component, e.g. a depolarizer, may be used to correct or improve the polarization of the amplified signal from the optical amplifier. The first seed light injection laser, the second seed light injection laser, and the polarization correction component may be used in an ONU to improve upstream wavelength channel transmissions in terms of data-rate and noise. Similarly, a cascaded injection locking configuration may be used at the OLT to improve downstream wavelength channel transmissions.

Figure 1:
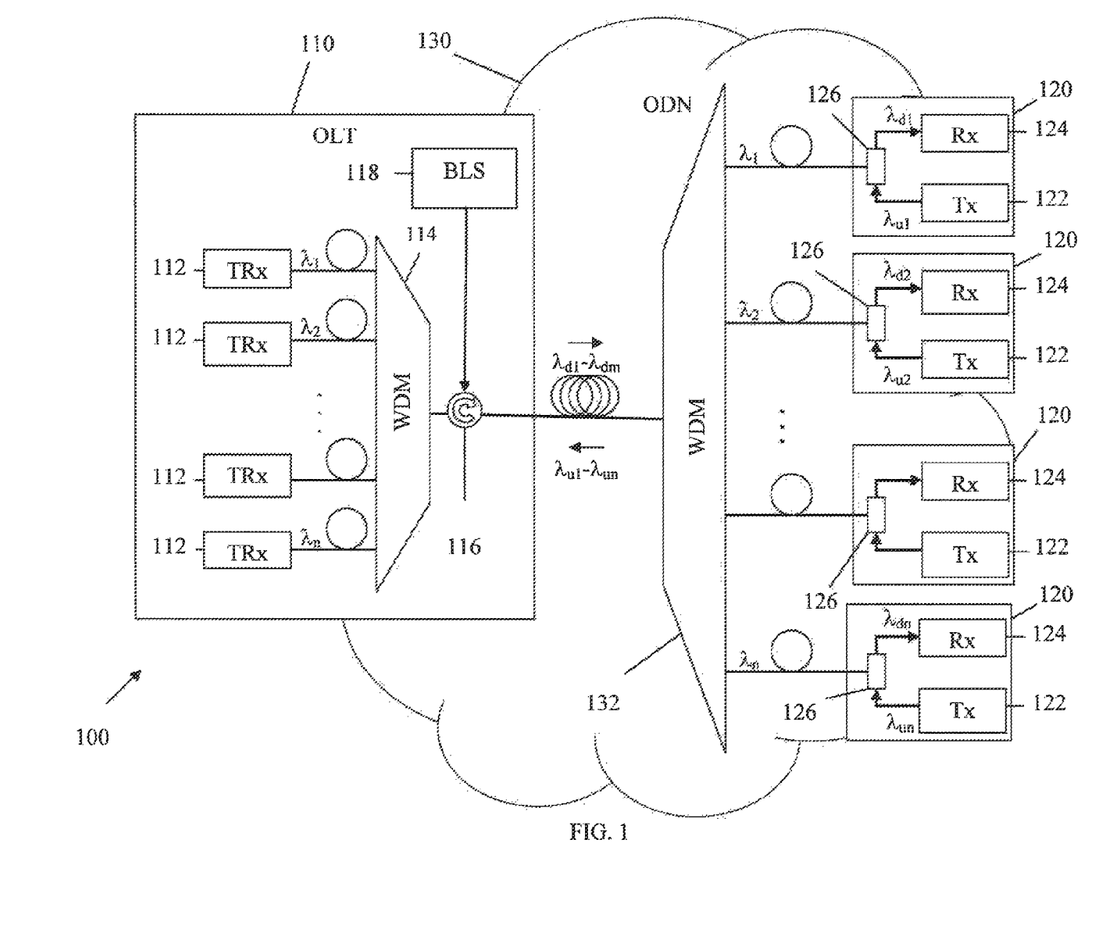
FIG. 1 is a schematic diagram of one embodiment of a PON.

FIG. 1 illustrates one embodiment of a PON 100. The PON 100 may comprise an OLT 110, an ODN 130, and a plurality of ONUs 120. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Examples of suitable PONs 100 include the asynchronous transfer mode PON (APON) and the broadband PON (BPON) defined by the International Telecommunication Union (ITU) Telecommunication Standardization Sector (ITU-T) G.983 standard, the Gigabit PON (GPON) defined by the ITU-T G.984 standard, the Ethernet PON (EPON) defined by the Institute of Electrical and Electronics Engineers (IEEE) 802.3ah standard, 10 Gigabyte EPON (10G-EPON) defined by the IEEE 802.3av standard, and the WPON, all of which are incorporated by reference as if reproduced in their entirety.

The OLT 110 may be one component of the PON 100. The OLT 110 may comprise a plurality of OLT transmitters/receivers (transceivers; TRx) 112, an OLT WDM 114, an OLT optical circulator 116, and a BLS 118, which may be arranged as shown in FIG. 1. In an embodiment, the OLT 110 may be any device that is configured to communicate with the ONUs 120 and another network (not shown). Specifically, the OLT 110 may act as an intermediary between the other network and the ONUs 120 in that the OLT 110 forwards data received from the network to the ONUs 120, and forwards data received from the ONUs 120 onto the other network. If the other network is a non-optical network that uses a different protocol than that of the PON 100, such as Ethernet or synchronous optical networking (SONET)/synchronous digital hierarchy (SDH), then the OLT 110 may also comprise a converter that converts the other network's data into the PON's protocol, and converts the PON's data into the other network's protocol. The OLT 110 may be located at a central location, such as a central office, or may be located at other locations as well.

The OLT transceivers 112 may be any devices capable of transmitting and/or receiving optical signals. In an embodiment, each OLT transceiver 112 may comprise an optical receiver, which may comprise a photodiode or photo-detector, and an optical transmitter, which may comprise a seed light injected laser, such as an IL FP LD, a SOA, a RSOA, a ROA, or a REAM. The OLT transceivers 112 may receive a plurality of upstream wavelength channels from the ONUs 120 and transmit a plurality of downstream wavelength channels to the ONUs 120. The downstream wavelength channels may comprise m single wavelengths or narrowband optical signals, e.g. $\lambda_{d1} \ldots \lambda_{dm}$ (m is an integer). The upstream wavelength channels may comprise n single wavelengths or narrowband optical signals, e.g. $\lambda_{u1} \ldots \lambda_{un}$ (n is an integer). In some embodiments, each of the downstream and/or upstream wavelength channels may correspond to a different ONU. Alternatively, some of the downstream and/or upstream wavelength channels may correspond to the same ONU. In some embodiments, the number of downstream wavelength channels may be substantially equal to the number of upstream wavelength channels, e.g. m may be substantially equal to n.

The OLT WDM 114 may be any device capable of filtering, combining, separating, multiplexing, and/or demultiplexing optical signals, such as an AWG. The OLT WDM 114 may be configured to receive the downstream wavelength channels from the OLT transceivers 112, combine the downstream wavelength channels into a combined downstream wavelength channel, and send the combined downstream wavelength channel to the ODN 130. Additionally, the OLT WDM 114 may be configured to receive the combined upstream wavelength channels from the ODN 130, separate the upstream wavelength channels, and send the separate upstream wavelength channels to the corresponding OLT transceivers 112.

The OLT optical circulator 116 may be any optical device that comprises multiple input/output ports and is capable of receiving an optical signal, e.g. via a first port, and forwarding the optical signal, e.g. via a second port. In an embodiment, the OLT optical circulator 116 may be a passive device comprising about three ports, and may be configured to route a first optical signal received on a first port to a second port, a second optical signal received on the second port to a third port, and a third optical signal received on the third port to the first port. The first port, second port, and third port may be ordered in the clockwise direction, in the counter-clockwise direction, or in any suitable alternative configuration. Specifically, the OLT optical circulator 116 may forward a broadband light signal from the BLS 118 to the ONUs 120 via the ODN 130, and similarly to the OLT 110 via the OLT WDM 114. In embodiments, the optical coupler may be coupled to a single optical fiber or port such that the OLT only has one input/output.

The BLS 118 may comprise any light source capable of emitting broadband light (e.g. white light) at about constant energy, such as an erbium-doped optical fiber amplifier (EDFA), a super-luminescent light-emitting diode (SLED), or any other component capable of emitting broadband light. The broadband light may include all wavelengths used by the various PON components. The complexity and/or cost of the BLS 118 may be proportional to the amount of output power of the BLS 118. Therefore, to reduce system complexity and/or cost, it may be desirable to reduce the power output of the BLS 118, e.g. using the techniques described herein.

Another component of the PON 100 may be the ODN 130. The ODN 130 may be a data distribution system comprised of optical fiber cables, splitters, distributors, and/or other equipment that may be used to direct the downstream wavelength channels from the OLT 110 to the ONUs 120 and the upstream wavelength channels from the ONUs 120 to the OLT 110. The components of the ODN 130 may be passive optical components. In some embodiments, the ODN 130 may also comprise active optical components that require power to operate, such as optical amplifiers. The ODN 130 typically extends from the OLT 110 to the ONUs 120 in a branching configuration as shown in FIG. 1, but may be configured in any other suitable configuration or architecture.

The ODN 130 may comprise an ODN WDM 132, which may be configured substantially similar to the OLT WDM 114. In some embodiments, the ODN WDM 132 may be an AWG. Accordingly, the ODN WDM 132 may receive the combined downstream wavelength channels from the OLT 110, separate the downstream wavelength channels, and distribute the separate downstream wavelength channels to the corresponding ONUs 120. The ODN WDM 132 may also receive the separate upstream wavelength channels from the ONUs 120, combine the upstream wavelength channels, and forward the combined upstream wavelength channels to the OLT 110. The ODN WDM 132 may also filter broadband light, received from the BLS 118 via the OLT optical circulator 116, into a plurality of seed light signals corresponding to the upstream wavelength channels, and distribute each seed light signal to a corresponding ONU 120. In some embodiments, the ODN WDM 132 may be part of the OLT 110, e.g. when the OLT 110 is coupled to the ODN 130 via a plurality of optical fibers. Alternatively or additionally, the ODN 130 may comprise the OLT WDM 114, the OLT optical circulator 116, and/or the BLS 118.

The ONU 120 may be another component of the PON 100. The ONU 120 may be any device configured to communicate with the OLT 110 and a customer or user (not shown). Specifically, the ONUs 120 may act as an intermediary between the OLT 110 and the customers in that the ONUs 120 may forward data received from the OLT 110 to the customers and forward data received from the customers to the OLT 110. The ONUs 120 are typically located at distributed locations, such as the customer premises, but may be located at other locations as well. In some embodiments, ONUs 120 and optical network terminals (ONTs) are similar, and thus the terms are used interchangeably herein.

Each ONU 120 may comprise an ONU receiver 124 and an ONU transmitter 122, which may be coupled by an optical diplexer 126. The ONU receiver 124 may be any device capable of receiving an optical signal from the OLT 110. For instance, the ONU receiver 124 may comprise a photodiode or a photo-detector. Each ONU receiver 124 (or a subset of the total ONU receivers 124) may be configured to receive a corresponding downstream wavelength channel from a corresponding OLT transceiver 112, wherein the downstream wavelength channel for each ONU 120 (or subset of ONUs 120) is unique. In some embodiments, at least some of the ONUs 120 may be configured to receive a plurality of different wavelength channels.

The optical diplexer 126 may be any device capable of filtering optical signals. Specifically, each of the optical diplexers 126 may separate a downstream wavelength channel and a corresponding upstream wavelength channel, which may have about the same wavelength or a matching narrow-band of wavelengths. The optical diplexer 126 may direct the upstream wavelength channel from an ONU transmitter 122 to the ODN 130 and the downstream wavelength channel from the ODN 130 to the ONU receiver 124. Additionally, the optical diplexers 126 may be configured to direct the seed light signals from the ODN 130 to the corresponding ONU transmitters 122 to provide the injection locking needed to operate the lasers. In embodiments, the optical diplexer 126 may be coupled to a single optical fiber or port such that the ONU only has one input/output.

The ONU transmitters 122 may comprise a plurality of devices capable of transmitting optical signals to the OLT 110, e.g. laser transmitters. Specifically, the ONU transmitters 122 may comprise seed light injected lasers, e.g. IL FP LDs, SOAs, RSOAs, ROAs, and/or REAMs. Accordingly, the ONU transmitters 122 may be capable of locking their wavelengths to the corresponding incoming seed light wavelength based on the injection locking mechanism, and thus transmit relatively high efficiency light from lower efficiency light of the same wavelength. Each ONU transmitter 122 (or a subset of the total ONU transmitters 122) may be configured to injection lock its transmitted wavelength to a corresponding seed light signal, e.g. received from the ODN WDM 132, wherein the seed light signal for each ONU 120 (or subset of ONUs 120) is unique. The wavelengths transmitted by the ONU transmitters 122, e.g. $\lambda_{u1} \ldots \lambda_{un}$, may be modulated, individually or collectively, and sent to the OLT 110 via the ODN 130.

Typically, the ONU transmitters 122 may comprise seed light injected lasers that may require substantial output power from the BLS 118, which may increase noise (e.g. RIN), decrease effective transmission distance, and/or reduce data-rate in the upstream wavelength channels from the ONUs 120. To improve the output of the ONU transmitters 122, e.g. reduce noise, increase effective transmission distance, and/or increase data-rate, each of the ONU transmitters 122 may be configured based on a cascaded injection locking configuration, which may use relatively low power broadband light from the BLS 118, and thus reduce cost and/or complexity. The cascaded injection locking configuration may use about two seed light injected lasers in each ONU transmitter 122, as described in detail below. Such may decrease BER, e.g. from about $10^{-3}$-$10^{-4}$ to about $10^{-8}$-$10^{-9}$ over a 20 kilometer (km) distance between the OLT 110 and ONUs 120.

Figure 2:
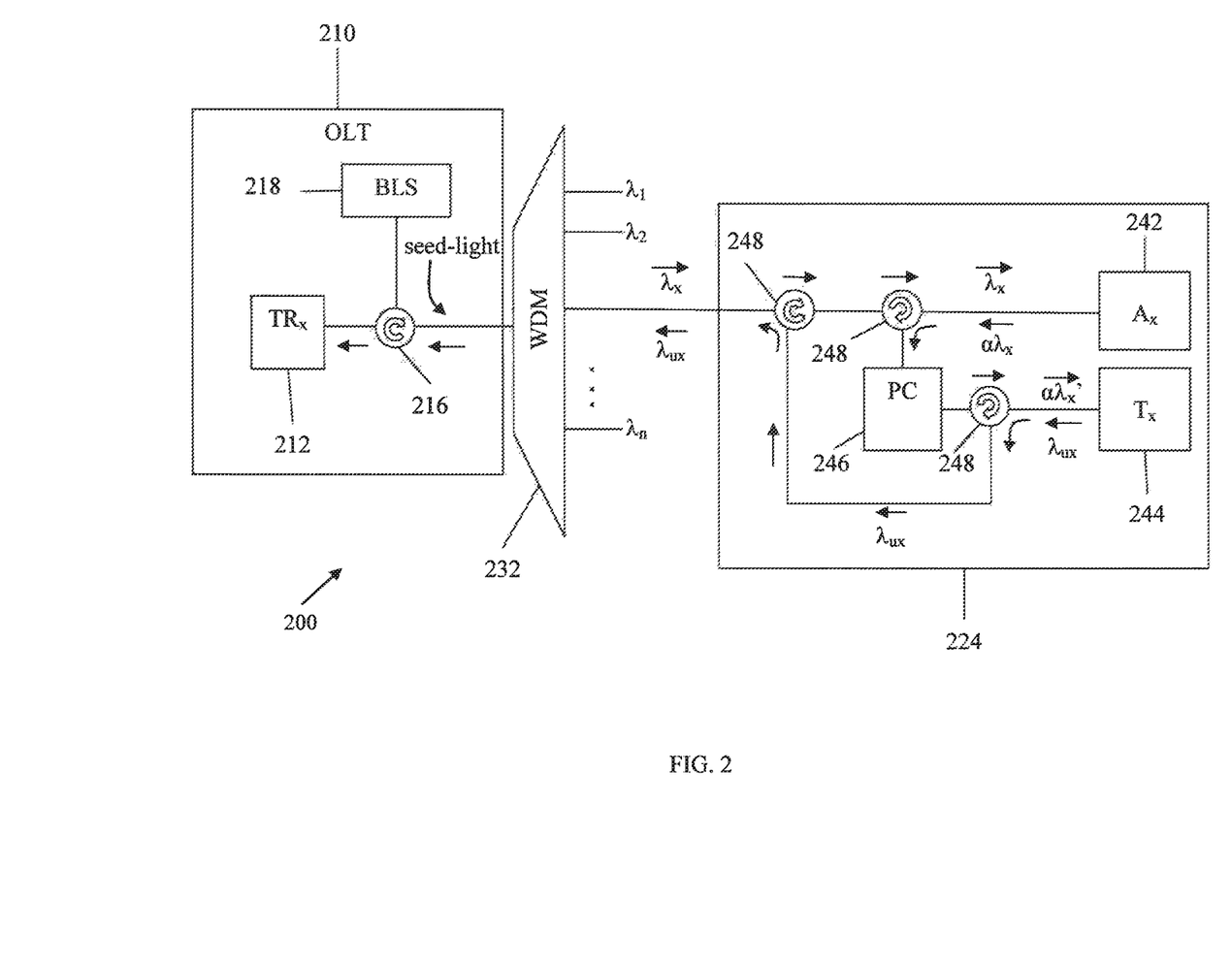
FIG. 2 is a schematic diagram of another embodiment of a cascaded injection locking configuration.

FIG. 2 illustrates an embodiment of a cascaded injection locking configuration 200, which may be implemented at an ONU, e.g. any ONU 120 in the PON 100. The components of the cascaded injection locking configuration 200 may be arranged as shown in FIG. 2, and may be configured substantially similar to the corresponding components of the PON 100. Specifically, the cascaded injection locking configuration 200 may comprise an OLT 210 comprising an OLT transceiver 212, an OLT optical circulator 216, and a BLS 218. The OLT 210 may be coupled to an ONU transmitter 224 via an ODN comprising an ODN WDM 232. The ONU transmitter 224 may comprise a first seed light injected laser 242, a second seed light injected laser 244, a polarization correction (PC) component 246, and a plurality of ONU optical circulators 248, which may be arranged as shown in FIG. 2.

The BLS 218 may transmit a broadband light signal that may be directed to the ODN WDM 232 by the OLT optical circulator 216. The ODN WDM 232 may filter the broadband light into a plurality of seed light signals corresponding to the upstream wavelength channels, e.g. for different ONUs. As such, the ODN WDM 232 may direct a corresponding seed light, e.g. $\lambda_x$, to the ONU transmitter 224, where the signal may be forwarded by the ONU optical circulators 248 to the first seed light injected laser 242, as shown by the arrows in FIG. 2. The first seed light injected laser 242 may be configured as an optical amplifier ($A_x$) for an incoming seed light signal, and as such may amplify the seed light signal, $\lambda_x$, into an amplified seed light signal, e.g. $\alpha\lambda_x$, using an injection locking technique. The amplified seed light signal, e.g. $\alpha\lambda_x$, may have substantially the same wavelength, substantially higher power, and/or less noise than the seed light signal, $\lambda_x$. The first seed light injected laser 242 may transmit the amplified seed light signal, e.g. $\alpha\lambda_x$, out of the same fiber in which the seed light signal, e.g. $\lambda_x$, was received, where the amplified seed light signal, e.g. $\alpha\lambda_x$, is thereafter routed by the optical circulator 248, as shown by the arrows in FIG. 2. In some embodiments, the first seed light laser may be coupled to a single optical fiber or port such that the first seed light laser only has one input/output, e.g. a single port serving as both an input and an output.

In some cases, the amplified seed light signal may have a different polarization state than the incoming seed light signal. Accordingly, the PC component 246 may be used to adjust and/or correct the polarization state of the amplified seed light signal. The PC component 246 may comprise any device that is capable of matching the polarization states of the first seed light injected laser 242 and the second seed light injected laser 244 or depolarizing the optical signals, such as a polarization maintaining fiber or a depolarizer. The PC component 246 may produce a seed light signal, e.g. $\alpha\lambda_x'$, that has a suitable polarization state for the second seed light injected laser 244.

The second seed light injected laser 244 may be configured as an optical transmitter (Tx) for an upstream wavelength channel that uses the amplified seed light signal from the first seed light injected laser 242. As such, the second seed light injected laser 244 may use the suitably polarized seed light signal, e.g. $\alpha\lambda_x'$, to injection lock its transmitted wavelength, modulate the transmitted wavelength with the user data, and produce a corresponding upstream wavelength channel, e.g. $\lambda_{ux}$. Further, matching the amplified seed light signal with the output wavelength of the second seed light injected laser 244 may improve transmission efficiency, the upstream wavelength channel data-rate, the upstream channel noise, and/or effective transmission distance of the upstream channel. In some embodiments, the second seed light laser 244 may be coupled to a single optical fiber or port such that the second seed light laser only has one input/output, e.g. a single port serving as both an input and an output.

The upstream wavelength channel, e.g. $\lambda_{ux}$, may be forwarded from the second seed light injected laser 244 to the ODN WDM 232 via the ONU optical circulator 248, as shown by the arrows in FIG. 2. The ODN WDM 232 may combine the upstream wavelength channel $\lambda_{ux}$ with a plurality of other upstream wavelength channels, e.g. $\lambda_1 \ldots \lambda_n$, from other ONU transmitters and send the combined upstream wavelength channels to the OLT 210. At the OLT 210, an OLT WDM (not shown) may separate the upstream wavelength channels, and send the upstream wavelength channel, e.g. $\lambda_{ux}$, to the corresponding OLT transceiver 212.

Figure 3:
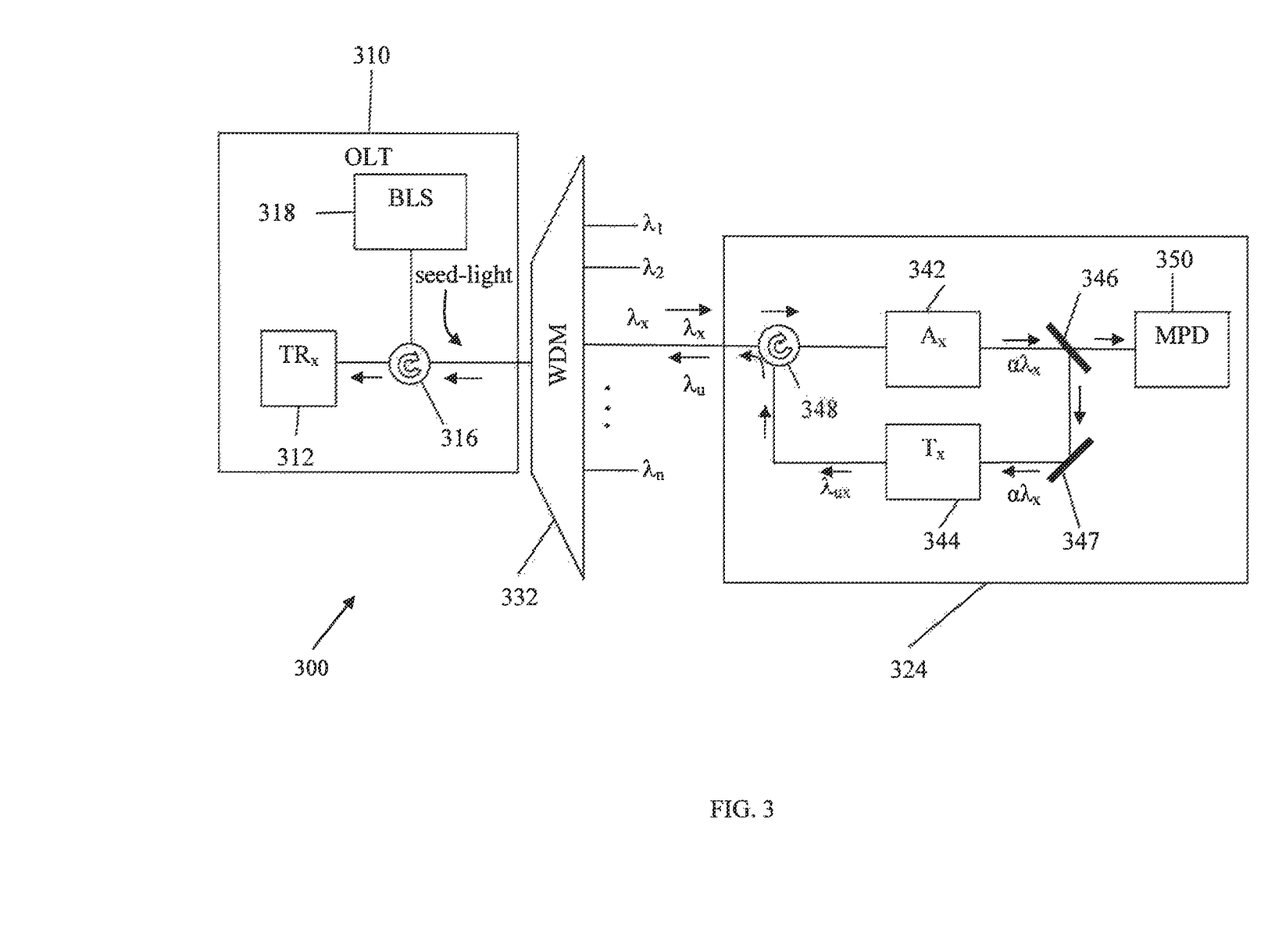
FIG. 3 is a schematic diagram of another embodiment of a cascaded injection locking configuration.

FIG. 3 illustrates another embodiment of a cascaded injection locking configuration 300, which may be implemented at the ONU. The components of the cascaded injection locking configuration 300 may be arranged as shown in FIG. 3, and may be configured substantially similar to the corresponding components of the PON 100. Specifically, the cascaded injection locking configuration 300 may comprise an OLT 310 comprising an OLT transceiver 312, an OLT optical circulator 316, and a BLS 318. The OLT 310 may be coupled to an ONU transmitter 324 via an ODN comprising an ODN WDM 332. The ONU transmitter 324 may comprise a first seed light injected laser 342, a second seed light injected laser 344, a first mirror 346, a second mirror 347, an ONU optical circulator 348, and optionally a monitoring photodiode/photodetector (MPD) 350, which may be arranged as shown in FIG. 3.

The BLS 318 may transmit a broadband light signal that may be directed to the ODN WDM 332 by the OLT optical circulator 316. The ODN WDM 332 may filter the broadband light into a plurality of seed light signals corresponding to the upstream wavelength channels, e.g. for different ONUs. As such, the ODN WDM 332 may direct a corresponding seed light, e.g. $\lambda_x$, to the ONU transmitter 324, where the seed light signal may be forwarded by the ONU optical circulator 348 to the first seed light injected laser 342, as shown by the arrows in FIG. 3. The first seed light injected laser 342 may be configured as an optical amplifier ($A_x$), and as such may amplify the seed light signal, $\lambda_x$, into an amplified seed light signal, e.g. $\alpha\lambda_x$, using an injection locking technique. The amplified seed light signal may have substantially the same wavelength, substantially higher power, and/or less noise than the seed light signal, $\lambda_x$. The amplified seed light signal, $\alpha\lambda_x$, may then be directed to the second seed light injected laser 344 via the first mirror 346 and the second mirror 347.

The second seed light injected laser 344 may be configured as an optical transmitter (Tx) for an upstream wavelength channel that uses the amplified seed light signal from the first seed light injected laser 342. Accordingly, the second seed light injected laser 344 may use the amplified seed light signal, e.g. $\alpha\lambda_x$, to injection lock its transmitted wavelength, and produce an upstream wavelength channel, e.g. $\lambda_{ux}$, at about the same wavelength as the seed light signal, e.g. $\lambda_x$, and/or the amplified seed light signal, e.g. $\alpha\lambda_x$. In some embodiments, the first seed light injected laser 342, the second seed light injected laser 344, or both may have a single input and a separate single output, e.g. a first port serving only as an input and a second port serving only as an output.

Additionally or alternatively, the first seed light injected laser 342, the second seed light injected laser 344, or both may have multiple combined input/output ports, e.g. a first port serving as an input/output and a second port serving as an input/output. In some embodiments, a three decibel (db) coupler may be used in place of the ONU optical circulator 348 such that the seed light signal is distributed to the first seed light injected laser 342 and the second seed light injected laser 344. In such embodiments, the first seed light injected laser 342 and the second seed light injected laser 344 may operate cumulatively to both amplify the seed light signal and/or generate the upstream optical wavelength e.g. $\lambda_{ux}$. In some embodiments, the second mirror 347 may be optional, e.g. when optical signal routing is done via a fiber or other means.

In some embodiments, the first mirror 346 may pass a portion of the amplified seed light signal to an MPD 350 to provide feedback to control/adjust the outputs of the first seed light injected laser 342 and the second seed light injected laser 344. The MPD 350 may be configured to monitor the output of the first seed light injected laser 342 and/or the second seed light injected laser 344 and provide feedback to control the operation and/or polarization state of the first seed light injected laser 342 and/or the second seed light injected laser 344. For example, the first mirror 346 may be a partial mirror that reflects about 90 percent of the light from the first seed light injected laser 342 to the second mirror 347 and transmits about 10 percent of the light from the first seed light injected laser 342 to the MPD 350.

In other embodiments, the cascaded injection locking configuration 200 or 300 may comprise more than two cascaded seed light injected lasers to provide improved upstream wavelength channel signal characteristics, use lower power BLS, and/or reduce cost. For example, the ONU transmitter 224 or 324 may comprise at least two cascaded seed light injected lasers that act as optical amplifiers and an additional seed light injected laser that acts as an optical transmitter. In an embodiment, the OLT transmitter 212 or 312 may also comprise a first seed light injected laser that acts as an optical amplifier and a second seed light injected laser that acts as an optical transmitter to provide improved downstream wavelength channel signal characteristics, e.g. in terms of data-rate and/or noise.

Figure 4:
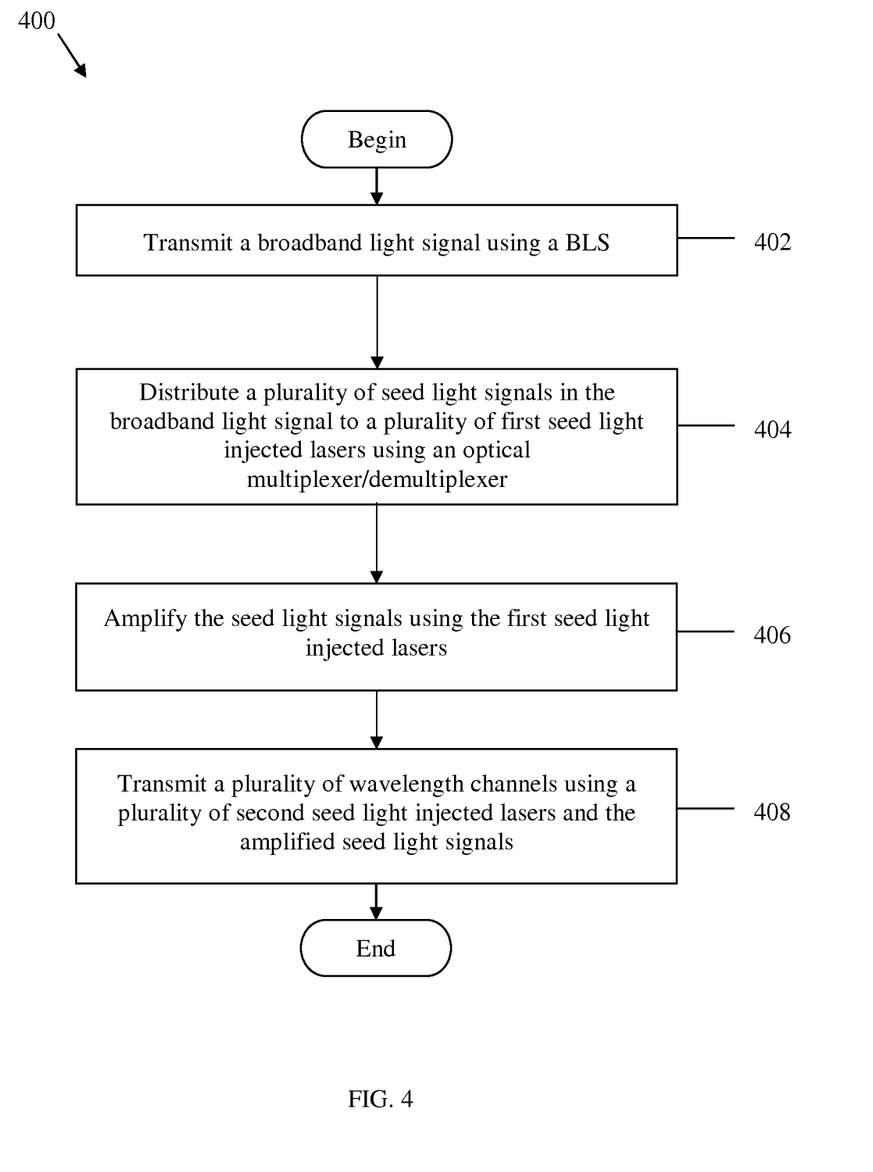
FIG. 4 is a flowchart of one embodiment of a cascaded injection locking method.

FIG. 4 illustrates an embodiment of a cascaded injection locking method 400, which may be implemented using the cascaded injection locking configuration 200 or 300. The method 400 may begin at block 402, where a broadband light signal may be transmitted using a BLS, e.g. the BLS 218 or 318. The broadband light signal may comprise a plurality of seed light signals that correspond to a plurality of wavelength channels and that may be used to provide injection locking for a plurality of seed light injected lasers that operate at the corresponding wavelengths, e.g. at the ONUs and/or the OLT. At block 404, a plurality of seed light signals in the broadband light signal may be distributed to a plurality of first seed light injected lasers using an optical multiplexer/demultiplexer, such as an AWG. For instance, an ODN WDM in the ODN may filter the broadband light signal into a plurality of seed light signals at a plurality of wavelengths or narrowband optical signals and send the seed light signals to the corresponding ONU transmitters, e.g. ONU transmitters 224 or 324.

At block 406, the seed light signals may be amplified using the first seed light injected lasers. For instance, the first seed light injected lasers 242 or 342 at a plurality of ONU transmitters 224 or 324 may receive the corresponding seed light signals and transmit a plurality of amplified seed light signals based on injection locking. At block 408, a plurality of wavelength channels may be transmitted using a plurality of second seed light injected lasers and the amplified seed light signals. For instance, the second seed light injected lasers 244 or 344 at the ONU transmitters 224 or 324 may receive the corresponding amplified seed light signals from the first seed light injected lasers 242 or 342 and transmit a plurality of corresponding upstream wavelength channels based on injection locking.

In some embodiments, the seed light signals in the broadband light signal emitted from the BLS may be used to injection lock a plurality of corresponding OLT transmitters, e.g. OLT transceivers 212 or 312. As such, a plurality of first seed light injected lasers at the corresponding OLT transceivers 212 or 312 may amplify the seed light signals and send the amplified signals to a plurality of corresponding second seed light injected lasers. The second seed light injected lasers may receive the amplified seed light signals and transmit a plurality of corresponding downstream wavelength channels.

Figure 5:
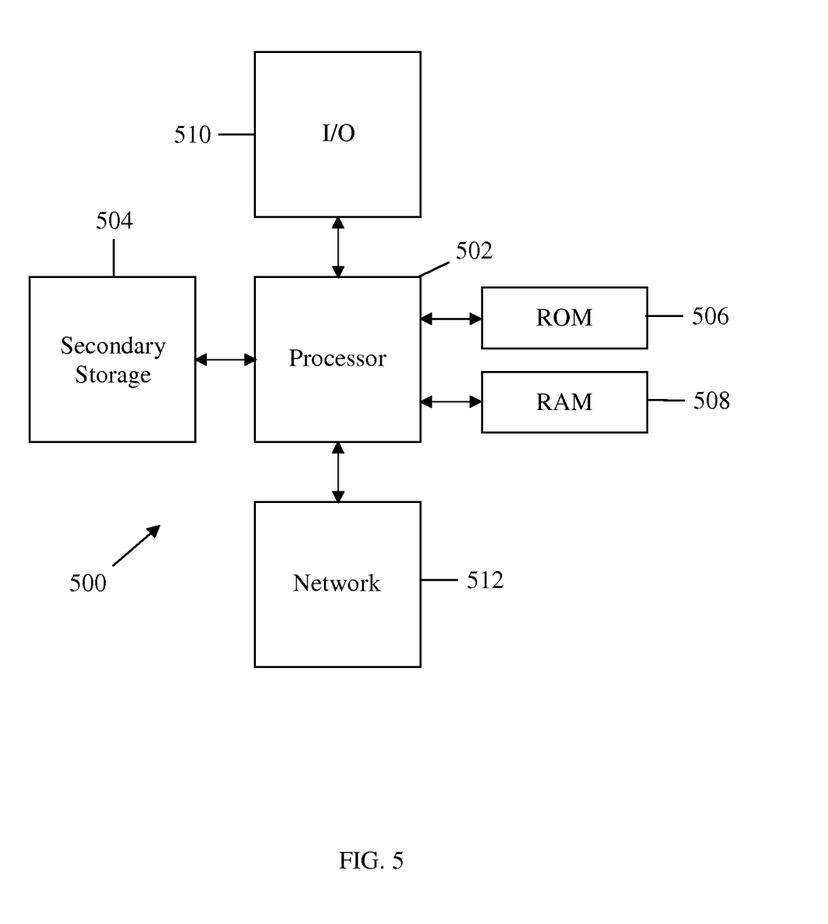
FIG. 5 is a schematic diagram of one embodiment of a general-purpose computer system.

The network described above may be implemented on any general-purpose network component, such as a computer or network component with sufficient processing power, memory resources, and network throughput capability to handle the necessary workload placed upon it. FIG. 5 illustrates a typical, general-purpose network component suitable for implementing one or more embodiments of a node disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) 510 devices, and network connectivity devices 512. The processor may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 704 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical network unit (ONU) comprising:
a first optical fiber;
a first optical circulator coupled to the first optical fiber;
a first seed light injected laser coupled to the first optical circulator, wherein the first optical circulator is positioned between the first seed light injected laser and the first optical fiber; and
a second seed light injected laser coupled to the first optical circulator and the first seed light injected laser, wherein the first optical circulator is positioned between the second seed light injected laser and the first optical fiber, wherein the first seed light injected laser and the second seed light injected laser each have only one optical input and only one optical output that is separate from the optical input.

2. The ONU of claim 1 further comprising a polarization correction component positioned between the first seed light injected laser and the second seed light injected laser.

3. An optical network unit (ONU) comprising:
a first optical fiber;
a first optical circulator coupled to the first optical fiber;
a first seed light injected laser coupled to the first optical circulator, wherein the first optical circulator is positioned between the first seed light injected laser and the first optical fiber;
a second seed light injected laser coupled to the first optical circulator and the first seed light injected laser, wherein the first optical circulator is positioned between the second seed light injected laser and the first optical fiber;
a polarization correction component positioned between the first seed light injected laser and the second seed light injected laser;
a second optical circulator positioned between the first optical circulator, the first seed light injected laser, and the polarization correction component; and
a third optical circulator positioned between the polarization correction component, the second seed light injected laser, and the first optical circulator.

4. The ONU of claim 3, wherein the first seed light injected laser and the second seed light injected laser each have only one optical input/output.

5. An optical network unit (ONU) comprising:
a first optical fiber;
a first optical circulator coupled to the first optical fiber;
a first seed light injected laser coupled to the first optical circulator, wherein the first optical circulator is positioned between the first seed light injected laser and the first optical fiber;
a second seed light injected laser coupled to the first optical circulator and the first seed light injected laser, wherein the first optical circulator is positioned between the second seed light injected laser and the first optical fiber; and
a monitoring photo-detector coupled to the first seed light injected laser and the second seed light injected laser.

6. The ONU of claim 5 further comprising:
a partially reflective mirror positioned between the first seed light injected laser, the monitoring photo-detector, and the second seed light injected laser; and
a fully reflective mirror positioned between the partially reflective mirror and the second seed light injected laser.

7. The ONU of claim 5, wherein the first seed light injected laser and the second seed light injected laser each have only one optical input and only one optical output that is separate from the optical input.

8. An optical network unit (ONU) comprising:
a first optical fiber;
a first optical circulator coupled to the first optical fiber;
a first seed light injected laser coupled to the first optical circulator, wherein the first optical circulator is positioned between the first seed light injected laser and the first optical fiber;
a second seed light injected laser coupled to the first optical circulator and the first seed light injected laser wherein the first optical circulator is positioned between the second seed light injected laser and the first optical fiber;
an optical receiver;
a diplexer coupled to the first optical fiber and the optical receiver; and
a second optical fiber coupled to the diplexer and optionally to an optical port,
wherein the diplexer is positioned between the first optical fiber, the second optical fiber, and the optical receiver, and wherein the second optical fiber or the optical port is the only optical input/output for the ONU.

9. The ONU of claim 1, wherein the first optical fiber is optionally coupled to an optical port, and wherein the optical fiber or the optical port is the only input/output of the ONU.

10. The ONU of claim 1, wherein the first seed light injected laser and the second seed light injected laser each comprise an injection locked Fabry-Perot laser diode (IL FP LD).

11. An apparatus comprising:
an optical amplifier configured to receive a seed light signal and produce an amplified seed light signal;
an optical transmitter configured to receive the amplified seed light signal, modulate the amplified seed light signal, and produce an optical signal within a wavelength channel; and
a partially reflective mirror positioned between the optical amplifier and the optical transmitter.

12. The apparatus of claim 11 further comprising a wavelength division multiplexer (WDM) configured to receive the optical signal, combine the optical signal with a plurality of upstream optical signals, and produce a combined upstream optical signal.

13. The apparatus of claim 12, wherein the WDM is further configured to receive an incoming broadband light signal, filter the seed light signal from the other wavelengths in the broadband light signal, and transmit the seed light signal to the optical amplifier.

14. An apparatus comprising:
an optical amplifier configured to receive a seed light signal and produce an amplified seed light signal;
an optical polarization component configured to receive the amplified seed light signal, adjust the polarization state of the amplified seed light signal, and produce a modified seed light signal, wherein the optical polarization component is a depolarizer configured to depolarize the amplified seed light signal from the optical amplifier; and
an optical transmitter configured to receive the modified seed light signal, modulate the modified seed light signal, and produce an optical signal within a wavelength channel.

15. An apparatus comprising:
an optical amplifier configured to receive a seed light signal and produce an amplified seed light signal;
an optical polarization component configured to receive the amplified seed light signal, adjust the polarization state of the amplified seed light signal, and produce a modified seed light signal, wherein the optical polarization component is a polarization maintaining fiber configured to maintain the polarization state of the amplified seed light injected laser to match the polarization state of the optical transmitter; and
an optical transmitter configured to receive the modified seed light signal, modulate the modified seed light signal, and produce an optical signal within a wavelength channel.

16. A method comprising
receiving a seed light signal;
amplifying the seed light signal using seed light injection locking, thereby producing an amplified seed light signal; and
producing an optical signal using the amplified seed light signal and seed light injection locking,
wherein less than all of the amplified seed light signal is reflected,
wherein the unreflected portion of the amplified seed light signal is used to control a polarization state of the optical signal, and
wherein the optical signal has about the same wavelength as the seed light signal.

17. A method comprising
receiving a seed light signal;
amplifying the seed light signal using seed light injection locking, thereby producing an amplified seed light signal;
producing an optical signal using the amplified seed light signal and seed light injection locking, wherein the optical signal has about the same wavelength as the seed light signal; and
reflecting the amplified seed light signal subsequent to amplifying the seed light signal but prior to producing the optical signal.

18. The method of claim 17, wherein less than all of the amplified seed light signal is reflected, and wherein the unreflected portion of the amplified seed light signal is used to control a polarization state of the optical signal.

19. The apparatus of claim 11 further comprising a fully reflective mirror positioned between the partially reflective mirror and the optical transmitter.

* * * * *

UNITED STATES PATENT AND TRADEMARK OFFICE
CERTIFICATE OF CORRECTION

| | | |
|---|---|---|
| PATENT NO. | : 8,543,001 B2 | Page 1 of 1 |
| APPLICATION NO. | : 12/901127 | |
| DATED | : September 24, 2013 | |
| INVENTOR(S) | : Ning Cheng | |

It is certified that error appears in the above-identified patent and that said Letters Patent is hereby corrected as shown below:

Title Page, Item (54) and in the Specification, Column 1, Line 1, Title of Patent should read as follows:

CASCADED INJECTION LOCKING OF FABRY-PEROT LASER FOR WAVELENGTH DIVISION MULTIPLEXING PASSIVE OPTICAL NETWORKS

Signed and Sealed this
Nineteenth Day of November, 2013

Teresa Stanek Rea
*Deputy Director of the United States Patent and Trademark Office*